Patented May 15, 1928.

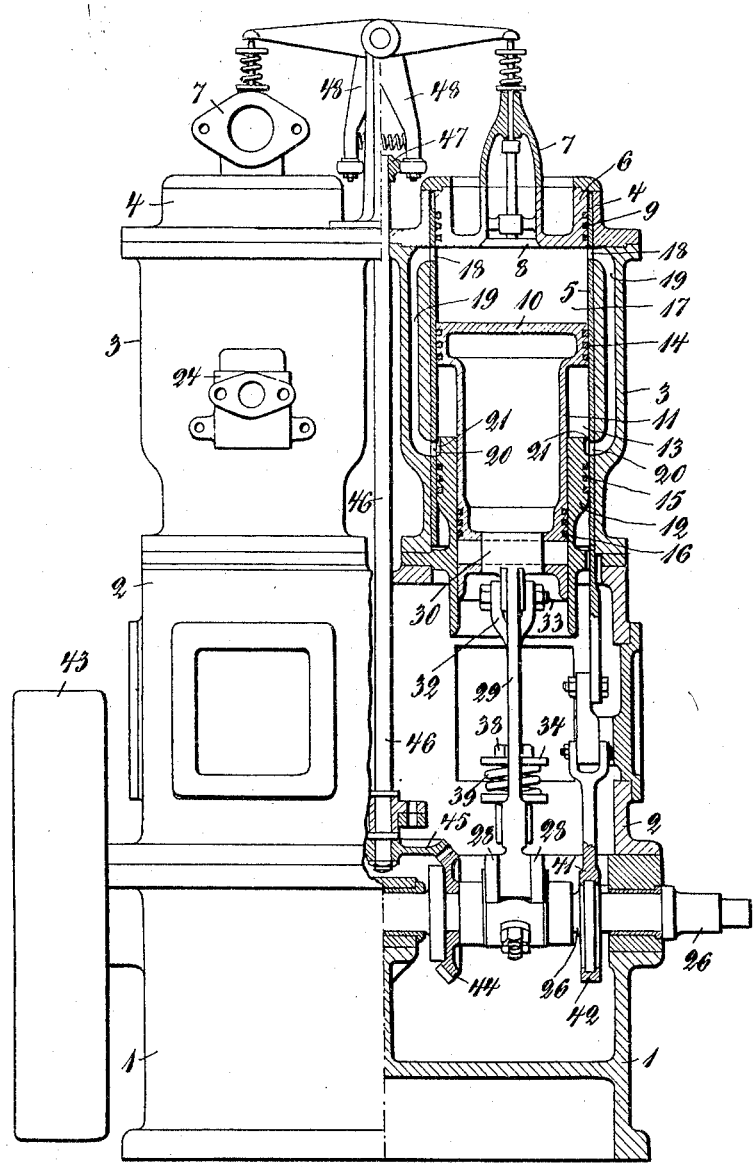

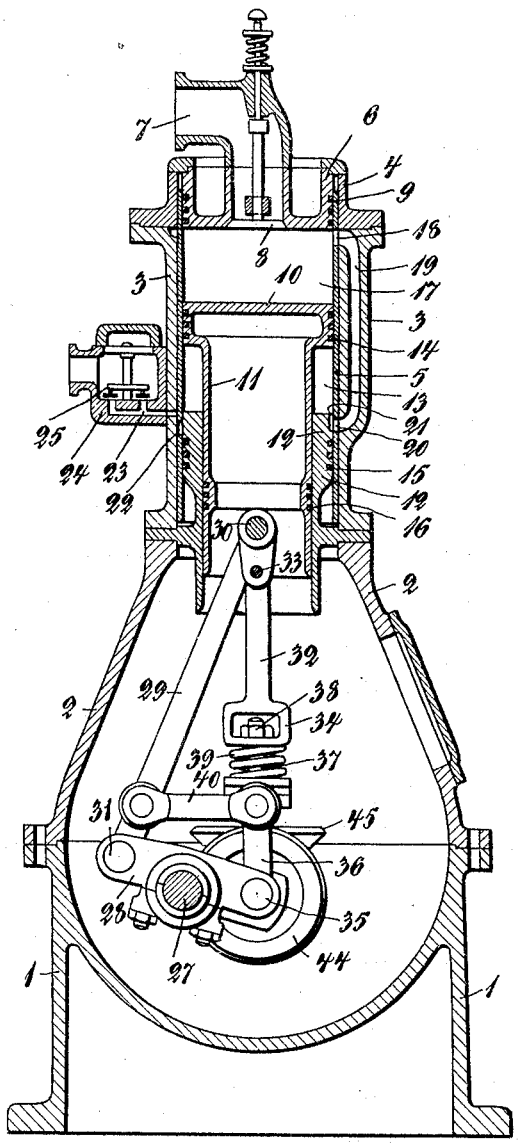

1,669,734

UNITED STATES PATENT OFFICE.

JULES AXEL RUTGER BENNET, OF STOCKHOLM, SWEDEN.

VACUUM PUMP.

Application filed April 4, 1927, Serial No. 180,773, and in Sweden April 24, 1926.

This invention relates to an improved vacuum piston pump by means of which a practically absolute vacuum can be reached.

To reach such a result the clearance space in the cylinder must be disappearingly small. Many different ways of reducing the clearance space have already been suggested. Such earlier designs have, however, proved to be unsatisfactory, due partly to unability of reaching a sufficiently high vacuum, and partly to their complicated construction.

Such disadvantages have been avoided in the present invention, the main characteristic of which is that a complete expulsion of the air or gas in the cylinder is achieved by such a design of the connecting rod and crank mechanism that the piston at the end of the exhaust stroke hits the cylinder cover before the crank has reached the inner dead centre and that thereupon the piston is kept pressed against the cylinder cover during a certain period of the crank motion to and from the inner dead centre. This is achieved by providing a connecting rod mechanism that is able to give or be springily compressed during the said period.

A vacuum pump constructed as a twin pump and in accordance with the invention is shown in the accompanying drawings, wherein:

Fig. 1 shows a side elevation of the pump partly in length section; and Fig. 2 shows a cross section perpendicular to the crank shaft. Both cylinder units are identical.

The crank case of the pump consists of the bottom part 1 and the upper part 2, upon which the cylinders are arranged. On the top of each cylinder 3, a cylinder cover 4 is attached. Inside the cylinder 3 a cylinder lining 5 is arranged which is axially movable and acts as a slide-valve. Inside the hollow cover 4 a cylindrical cylinder head 6 is attached to the same and so dimensioned that it fits into the upper end of the movable cylinder lining 5 and allows the axial motion of the latter. 7 is a suction inlet attached to the cylinder head 6 and provided with a spring weighted valve 8. The inner bottom of the cylinder head 6 and the valve 8 are given the same shape, preferably plane, as the upper surface of the piston so that when the latter is pressed against the bottom of the cylinder head there will be practically no free space between them. The cylinder head 6 is provided with piston rings 9 for tightness against the cylinder lining 5.

10 is the pump piston that is movable inside the cylinder lining 5. The piston is preferably hollow. It is provided with a cylindrical extension 11 of smaller diameter and extending downwards. The extension 11 is surrounded and guided by a stationary cylindrical member 12 that by means of a flange is attached between the crank case and the cylinder 3. The outside of the member 12 acts as a guide for the cylinder lining 5. Between the piston proper 10 and the member 12 a chamber 13 of variable size is formed. Piston rings 14 and 15 are arranged between the lining 5, the piston 10, and the member 12, as well as piston rings 16 between the extension 11 and the member 12.

The upper end of the cylinder lining 5 is provided with exhaust openings 18 adapted to communicate with exhaust channels 19 in the cylinder wall. The lower end of the channels 19 are adapted to communicate with other openings 20 in the cylinder lining and by means of them with grooves or recesses 21 in the wall of the member 12 leading to the chamber 13. Besides there is provided in the lower part of the lining 5 (Fig. 2) an opening 22 adapted to connect the chamber 13 with a channel 23 arranged in an exhaust valve housing 24 attached to the cylinder 3. Said housing contains a spring weighted valve arrangement 25 adapted to prevent the readmittance of air or gas into the pump.

26 is the crank shaft and 27 the crank pin. The crank pin is connected with the piston by means of a connecting rod arrangement adapted to be springily deformed. The cap of the connecting rod bearing is formed as a double armed lever 28. One end of said lever is pivotally connected to the lower end of a stiff rod 29 by means of a pin 31. The other end of the rod 29 is pivotally connected with the piston pin 30. A little below the piston pin 30 the rod 29 is pivotally connected by means of a pin 33 to the upper end of a rod 32 whose lower end is shaped as an eye 34 or the like. At the end opposite the pin 31 the lever 28 is pivotally connected by means of a pin 35 with the lower end of a rod 36 whose upper end 37 is entered through a hole in the lower part of the eye 34 inside of which it is provided with threads and a nut 38. A compressed spring 39 is arranged around the end 37 between the eye and a flange provided on the rod 36. The spring 39 presses the rod 32 upwards which motion is limited by the nut 38. The rods 29 and 36 are connected by means of the link 40. When the crank pin 27 is in its lowest position and the nut is in contact with the lower part of the eye 34, the distance between the piston and the cylinder head is somewhat less than the diameter of the crank circle. Shortly before the inner dead centre is reached by the crank pin, the piston has reached the bottom of the cylinder head. At the continued motion of the crank pin 27 to the dead centre the lower end of the rod 29 will turn the lever 28 around the crank pin 27 in such a way that the spring 39 will be further compressed thus pressing the piston springily against the bottom of the piston head. When the crank pin has passed the dead centre the lever 28 begins to turn back in the opposite direction and the pressure of the spring 39 to lessen, and after a certain period the rod 36 and the eye 34 will have retaken their former relative position.

The movable cylinder lining receives its motion by means of an excentric disc 42 on the crank shaft 26 and an excentric strap 41. The crank shaft may be provided with a flywheel 43. On the crank shaft a bevel gear 44 is arranged in mesh with a bevel gear 45 on the lower end of a shaft 46 arranged between the cylinders and at the top provided with a cam disc 47 which is common to both cylinders and in the known way acts upon the valve levers 48 of the suction valves 8 so that in any case the suction valves are mechanically opened for a moment at the end of the suction stroke, even if the pressure in the bell, receiver or the like has been too low to be able to automatically open the suction valve.

In the position shown in the drawings the piston is about in its middle position moving upwards, and the movable cylinder lining 5 is in its lowest position. During the continued upwards motion of the piston the air in the pumproom 17 is pressed out through the exhaust openings 18, the channels 19, the openings 20, the grooves or recesses 21, into the variable chamber 13. Meanwhile the cylinder lining 5 begins to move downwards. During the downwards motion of the piston air or gas is sucked from the receiver or the like through the valve 8 into the pump room 17. The air in the chamber 13 is meanwhile exhausted through the opening 22 that during the upwards motion of the cylinder lining 5 has come into alignment with the channel 23.

It is obvious that the several parts of the pump described above and illustrated in the drawings may be changed in various ways without departing from the principle of the invention and the right is herein reserved to any such changes that may properly fall within the scope of the appended claims.

I claim:

1. A vacuum pump comprising pump cylinder; piston therein; crank shaft; a connecting rod and crank mechanism giving the piston a reciprocating motion; suction valve; exhaust valve; means for mechanically operating the suction valve; means for mechanically operating the exhaust valve; the connecting rod and crank mechanism being adapted so as to press the piston against the cylinder head shortly before the crank pin has passed the inner dead centre; means for giving the lower end of the connecting rod a rotary motion around the crank pin when the piston has reached the cylinder head; means for keeping the piston pressed springily against the cylinder head during the period of their contact.

2. A vacuum pump comprising pump cylinder; piston therein; crank shaft; a connecting rod and crank mechanism giving the piston a reciprocating motion; suction valve; exhaust valve; means for mechanically operating the suction valve; means for mechanically operating the exhaust valve; the connecting rod and crank mechanism being adapted so as to press the piston against the cylinder head shortly before the crank pin has passed the inner dead centre; the connecting rod mechanism being composed of two rods, both pivotally connected to the piston at their upper ends and at their lower ends excentrically connected with the crank pin; one of said rods being stiff and the other adapted to be compressed springily so as to enable the lower end of the stiff rod to turn downwards around the crank pin when the piston has reached the cylinder head; simultaneously compressing the other rod so as to keep the piston pressed springily against the cylinder head during the period of their contact.

3. A vacuum pump as claimed in claim 2, and wherein the lower ends of the said two rods are pivotally connected with each of the two arms of a double-armed lever arranged to be pivoted about the crank pin.

4. A vacuum pump comprising pump cylinder; piston; crank shaft; a connecting rod and crank mechanism giving to the piston a reciprocating motion; a mechanically operated suction valve arranged in the cylinder head; a mechanically operated exhaust valve; exhaust openings adapted to communicate with channels; said piston being provided with a narrower cylindrical extension extending downwards, said extension fitting into and being guided by a stationary cylindrical member provided with an exterior cylindrical portion so that a chamber of variable size is formed between the piston and the said member adapted to receive the exhausted gases or air by means of the said exhaust openings and the said exhaust channels; means being provided for the escape of said gases out of said chamber during the suction stroke of the piston.

In testimony whereof I have hereunto set my hand.

JULES AXEL RUTGER BENNET.